United States Patent
Gregory

(10) Patent No.: US 6,392,734 B1
(45) Date of Patent: *May 21, 2002

(54) DOUBLE METAL PIXEL ARRAY FOR SILICON LC LIGHT VALVE FEATURING SHIELDED INTER-PIXEL ISOLATION REGIONS

(75) Inventor: Haydn James Gregory, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,479

(22) Filed: Sep. 16, 1999

Related U.S. Application Data

(63) Continuation-in-part of application No. 09/262,363, filed on Mar. 4, 1999.

(51) Int. Cl.[7] ..................... G02F 1/1343; G02F 1/1339
(52) U.S. Cl. ..................... 349/153; 349/142; 349/144
(58) Field of Search ..................... 349/153, 144, 349/142; 438/36; 430/320

(56) References Cited

U.S. PATENT DOCUMENTS

| | | | | |
|---|---|---|---|---|
| 4,185,894 A | | 1/1980 | Hilton et al. ............ | 350/338 |
| 4,999,619 A | | 3/1991 | Velde .................... | 340/784 |
| 5,473,448 A | | 12/1995 | Yoshinaga et al. ......... | 359/51 |
| 5,706,067 A | | 1/1998 | Colgan et al. ............ | 349/114 |
| 5,764,324 A | | 6/1998 | Lu et al. ................ | 349/113 |
| 5,838,715 A | | 11/1998 | Corzine et al. ........... | 372/96 |
| 5,982,472 A | | 11/1999 | Moore .................... | 349/156 |
| 6,051,446 A | * | 4/2000 | Moore et al. ............. | 438/36 |
| 6,190,936 B1 | * | 2/2001 | Moore et al. ............. | 438/36 |
| 6,233,033 B1 | * | 5/2001 | Moore .................... | 348/139 |

OTHER PUBLICATIONS

Paul M. Moore, "Polished Self–Aligned Pixel for a Liquid Crystal Silicon Light Valve", Co–pending U.S. Application No. 09/204,825 filed Dec. 3, 1998.

Colgan, E.G., et al., "On–Chip Metallization Layers for Reflective Light Valves", IBM J. Res. Develop. vol. 42 No. 3/4 May/Jul. 1998, pp. 339–345.

Takayama, S., et al., "Effects of Y or Gd Addition on the Structures and Resistivities of Al Thin Films", J. Vac. Sci. Technol. A 14(4), Jul./Aug. 1996, pp. 2499–2504.

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'Hara, A., Underwood, I., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, pp. 277280.

* cited by examiner

Primary Examiner—William L. Sikes
Assistant Examiner—Julie Ngo
(74) Attorney, Agent, or Firm—Stallman & Pollock LLP

(57) ABSTRACT

A light valve array features discrete pixel cells electronically isolated by dielectric spacers formed by etching a dielectric layer conforming to sidewalls of a patterned first metal layer. Formation of a second metal layer over the dielectric spacer structures, followed by chemical-mechanical polishing of the second metal layer to stop on the tips of the sidewall spacers, completes fabrication of the array. Interpixel regions corresponding to the dielectric spacers are substantially shielded from incident light by projecting metal edges of the electrodes supported by the curved upper surface of the spacer structures.

4 Claims, 16 Drawing Sheets

DOUBLE METAL PIXEL ARRAY FOR SILICON LC LIGHT VALVE FEATURING SHIELDED INTER-PIXEL ISOLATION REGIONS

CROSS-REFERENCE TO RELATED APPLICATION

This is a continuation-in-part application of pending U.S. nonprovisional application no. 09/262,363, filed Mar. 4, 1999 and entitled "Double Metal Pixel Array For Light Valve Utilizing Lateral Sublithographic Spacer Isolation".

BACKGROUND OF THE INVENTION

1. Field of the Invention

The present invention relates to light valves, and in particular, to pixel cell arrays for light valves which utilize sublithographic isolation based upon the formation of dielectric spacer structures.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1 shows a cross-sectional view of adjacent thin LC transducer pixel cells in a conventional light valve. Light valve portion 100 comprises adjacent pixel cells 110a and 110b having liquid crystal (LC) material 111 sandwiched in gap 106 between a top plate and a bottom plate. Top plate 102 is composed of a translucent material, typically glass. The bottom plate is formed by the reflective metal pixel electrodes 112a and 112b of adjacent pixels 110a and 110b, respectively.

Pixel electrodes 112a and 112b are separated and electrically isolated by trench 118. Pixel electrodes 112a and 112b lie on top of an upper intermetal dielectric layer 128 that is one component of interconnect 104. Interconnect 104 overlies storage capacitor structures 118a and 118b formed within underlying silicon substrate 105. Underlying storage capacitors 118a and 118b are in electrical communication with pixel electrodes 112a and 112b, respectively, through metal-filled vias 140 and middle interconnect metallization layer 124 and lower interconnect metallization layer 122.

During operation of pixel cells 110a and 110b, driving circuits (not shown) are electrically coupled with storage capacitors 118a and 118b through row select lines 120a and 120b formed as part of first metallization layer 122 of interconnect 104. Storage capacitors 118a and 118b in turn transmit voltages to pixel cell electrodes 112a and 112b through portions of middle and lower metallization layers 124 and 122, respectively.

Selective application of voltage to pixel electrodes 112a and 112b switches pixel cells 110a and 110b of light valve 100 on and off. Specifically, a voltage applied to a pixel electrode varies the direction of orientation of the liquid crystal material on the pixel electrode. A change in the direction of orientation of the liquid crystal material at the pixel electrode changes the optical characteristics of the light traveling through the liquid crystal. If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

FIGS. 2AA–2DB illustrate the steps of the conventional process for forming an array of pixel cells in a light valve. For purposes of convention, all FIGS. 2_A illustrate a top view of the pixel cell, all FIGS. 2_B illustrate a cross-sectional view of the pixel cell along line 2_B–2_B' of the FIG. 2_A.

FIGS. 2AA–2AB illustrate the starting point for the conventional process for fabricating a thin LC transducer pixel cell. Starting structure 200 is created by forming an upper intermetal dielectric layer 212 over a lower interconnect metallization layer 214. A central portion of upper intermetal dielectric layer 212 is then etched to form via 216. A liner (not shown) typically composed of a Ti/TiN layer combination, is then formed on the walls of via 216, and via 216 is filled with metal, typically (chemical vapor deposition) Tungsten. Excess metal is then removed from the surface of upper dielectric layer 212, typically by a combination of etching and chemical-mechanical polishing (CMP).

FIGS. 2BA–2BB illustrate formation of the metal pixel electrode in accordance with the conventional process. Metal pixel electrode layer 206 is formed over the entire surface of the pixel cell.

FIGS. 2CA–2CB illustrate patterning of a photoresist mask 207 over pixel electrode layer 206. FIGS. 2DA–2DB show the etching of regions of pixel electrode layer 206 unmasked by photoresist 207, to form a plurality of intersecting trenches 218, followed by stripping of photoresist mask 207. Intersecting trenches 218 in turn define a plurality of discrete pixel cell electrodes 230.

Fabrication of the thin LC transducer pixel cell is completed by forming an alignment surface (not shown) for the LC material positioned on top of the pixel electrode. Forming this alignment surface is a two step process. First, a dielectric film (typically polyimide) is deposited on top of the pixel electrode. Second, the dielectric film is scored by a rubbing wheel, which traverses the surface of the pixel cell and gouges the alignment surface in a uniform direction. Liquid crystal material is then placed within the cell, and a top glass plate is secured to the tops of the support pillars.

The conventional fabrication process described above in FIGS. 2AA–2DB is adequate to produce functional thin LC transducer pixel cells. However, the conventional process flow suffers from a number of disadvantages.

One important problem of the conventional pixel array is flickering due to penetration of incident light into inter-pixel regions. In the array shown in FIG. 1, incident light can penetrate through gap 130 between adjacent pixel electrodes 112a and 112b into interconnect 104. Incident light can enter gap 130, refract at corners 134 of the pixel cell electrodes 112a and 112b, and then reflect off of the second layer of interconnect metallization 124 through a variety of paths until finally penetrating silicon substrate 104.

Penetration of incident light into silicon substrate 105 can induce unwanted currents that can disturb the charge present in storage capacitors 118a and 118b. As a result of this fluctuation in charge, the luminance of pixel cells 110a and 110b may change between succeeding write states, causing the image to "flicker." The flicker produced by the penetrating light waves reduces image quality, and can cause eye strain in an observer.

Therefore, there is a need in the art for a pixel array and a process of forming a pixel array wherein inter-pixel regions are substantially shielded from the penetration of incident light in order to prevent flickering of the image.

Another problem created by the penetration of incident light into inter-pixel regions of the array is the creation of dark lines in the image. Light incident to array 100 of FIG. 1 may penetrate through trench 118 between adjacent pixel electrodes 112a and 112b. Intermetal dielectric layer 128 below trench 118 is substantially transparent to this incident light, which next encounters interconnect metallization layer 124. Metallization layer 124 may bear an anti-reflective coating as a result of prior photolithographic steps. As a result, light incident to inter-pixel regions is absorbed rather than reflected, and is perceived by a viewer as a dark line. This dark inter-pixel region stands in stark contrast to the bright surrounding reflective pixel electrodes. Projection displays can in turn magnify the light reflected from the pixel array to such an extent that non-reflective space between pixels is readily observable and may distort the image.

Therefore, there is a need in the art for a pixel array and a process of forming a pixel array wherein inter-pixel regions are substantially reduced in size in order to prevent the appearance of dark lines.

An additional problem with the conventional pixel array shown in FIG. 1 is that the step of defining and etching the inter-pixel trenches requires an additional masking step. This masking step carries with it penalties in terms of additional defects and higher cost.

Therefore, there is a need in the art for a pixel array and a process of forming a pixel array wherein a separate masking step is not required to define the respective pixel electrodes of the array.

A further problem with the conventional pixel array shown in FIG. 1 is that minimum spacing between adjacent pixels is dictated by the limits of resolution of the photolithographic process employed. This limitation is manifested in the step of patterning the mask to form the trenches in the pixel electrode layer, as shown above in FIGS. 2CA–2CB. For example, in a 0.3 $\mu$m linewidth photolithographic technology, the distance across trench 218 of FIGS. 2DA–DB could be no less than 0.3 $\mu$m.

The closer together the pixels of the array, the better the array will perform. This is because a higher pixel density will provide greater resolution of details of the image. Close proximity between pixels also reduces unwanted optical artifacts attributable to interruption in the continuous pixel array backplane by topography associated with inter-pixel isolation structures.

Therefore, there is a need in the art for a process of forming an array of pixel cells where inter-pixel spacing is not constrained by photolithographic parameters, thereby enabling formation of arrays having greater pixel cell densities and enhanced resolution and clarity.

SUMMARY OF THE INVENTION

The present invention provides a pixel array and process flow for forming an array of pixel cells wherein the edges of the pixel electrodes substantially shield inter-pixel regions from the penetration of incident light. The present invention does not rely upon photolithography to define inter-pixel isolation. Instead, adjacent pixels of the array are electrically insulated from one another by dielectric spacer structures formed by the deposition and etching of a dielectric layer conforming to raised features of a first metal layer. Formation of a second metal layer over the curved tops of the spacer structures creates metal tips at the edge of the pixel electrodes. These tips project over a substantial portion of the dielectric spacers, shielding inter-pixel regions from the penetration of incident light.

The thickness of the sidewall spacers is determined by the conditions under which the dielectric forming the spacers is deposited. The deposition rate of dielectric material can be carefully controlled to reliably produce spacers having a thickness of less than the minimum linewidth of a given photolithography system. In this manner, inter-pixel isolation in accordance with the present invention can result in fabrication of pixel arrays having much greater cell densities than found in conventional arrays.

A process flow for forming a pixel cell array in accordance with one embodiment of the present invention comprises the steps of forming a first metal layer on top of an upper intermetal dielectric layer, and forming a first dielectric layer over the first metal layer. A photoresist mask is patterned over the first metal layer in a checkerboard pattern which includes a plurality of masked squares but which excludes corners of the masked squares. Unmasked portions of the first dielectric layer and the first metal layer are etched to stop on the upper intermetal dielectric layer, leaving a raised portion of the first metal layer having a top and sidewalls. The photoresist mask is removed, and a second dielectric layer is formed over the upper intermetal dielectric layer and the top of first metal layer, the second dielectric layer conforming to the sidewalls of the raised portion of the first metal layer. The second dielectric layer is etched to remove the second dielectric layer over the upper intermetal dielectric layer while leaving dielectric spacer structures along the sidewalls, the dielectric spacer structures having a curved upper surface. A second metal layer is formed over the dielectric spacer structures. Chemical-mechanical polishing is performed through the second metal layer to stop on the curved upper surface of the dielectric spacer structures and form a plurality of discrete pixel electrodes electrically isolated by the dielectric spacer structures, edges of the pixel electrodes projecting over a portion of curved upper surface of the dielectric spacer structures and substantially shielding the dielectric spacer structures from incident light.

A pixel array in accordance with one embodiment of the present invention comprises an array of pixel cells arranged in a checkerboard pattern having a first set of squares alternating with a second set of squares, the first set of squares formed from a first metal layer and lacking corners, and the second set of squares formed from a second metal layer. Dielectric spacer structures intervene between the first set of squares and the second set of squares, the dielectric spacer structures formed by deposition of dielectric material over the first metal layer, the dielectric spacer structures including a curved upper portion supporting an edge of the second set of squares, the edge substantially shielding the dielectric spacer structures from incident light.

The features and advantages of the present invention will be understood upon consideration of the following detailed description of the invention and the accompanying drawings.

DETAILED DESCRIPTION

The increasing reliance upon digital integrated circuit technology has heightened the importance of ensuring that process flows leading to formation of pixel arrays are compatible with those leading to formation of CMOS devices. One characteristic feature of CMOS process flows is formation of dielectric spacer structures on either side of the polysilicon gate.

Figure 1:
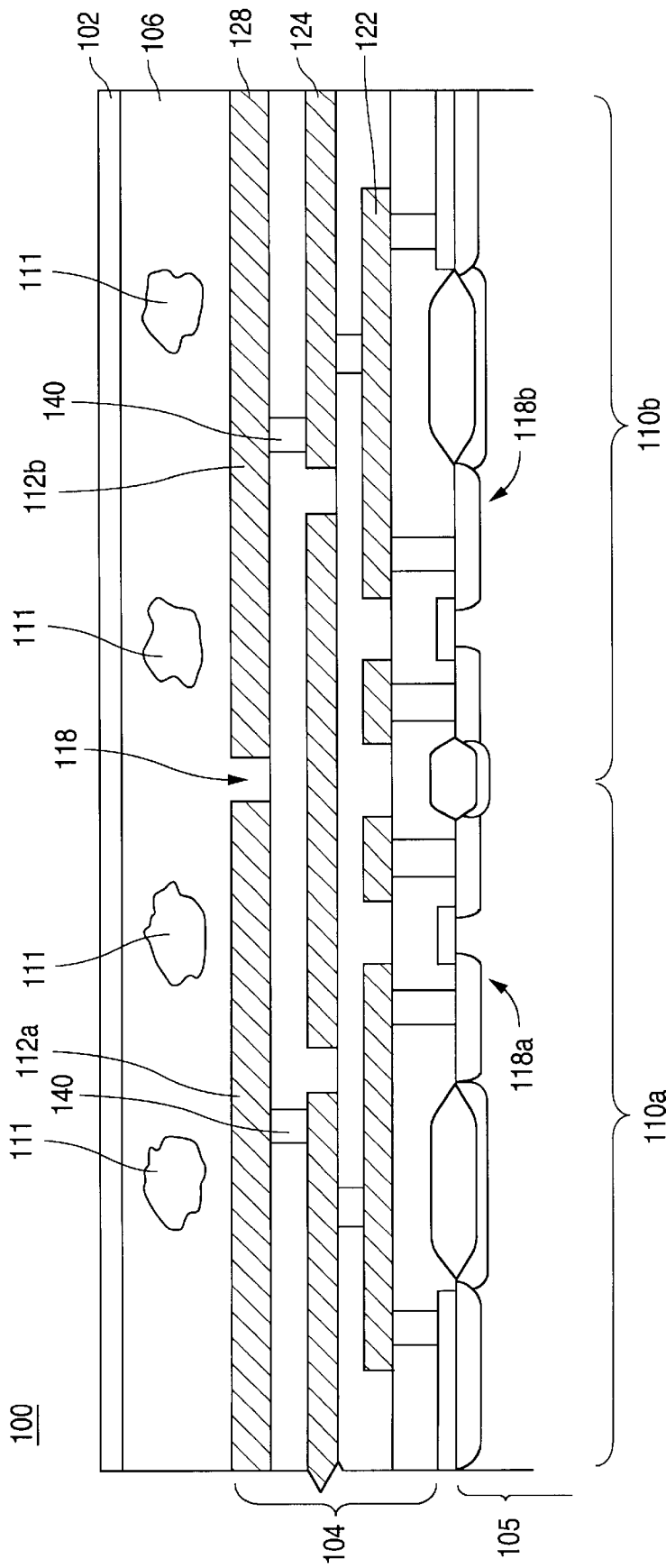
FIG. 1 shows a cross-sectional view of adjacent pixel cells in a conventional light valve.
Figure 2A:
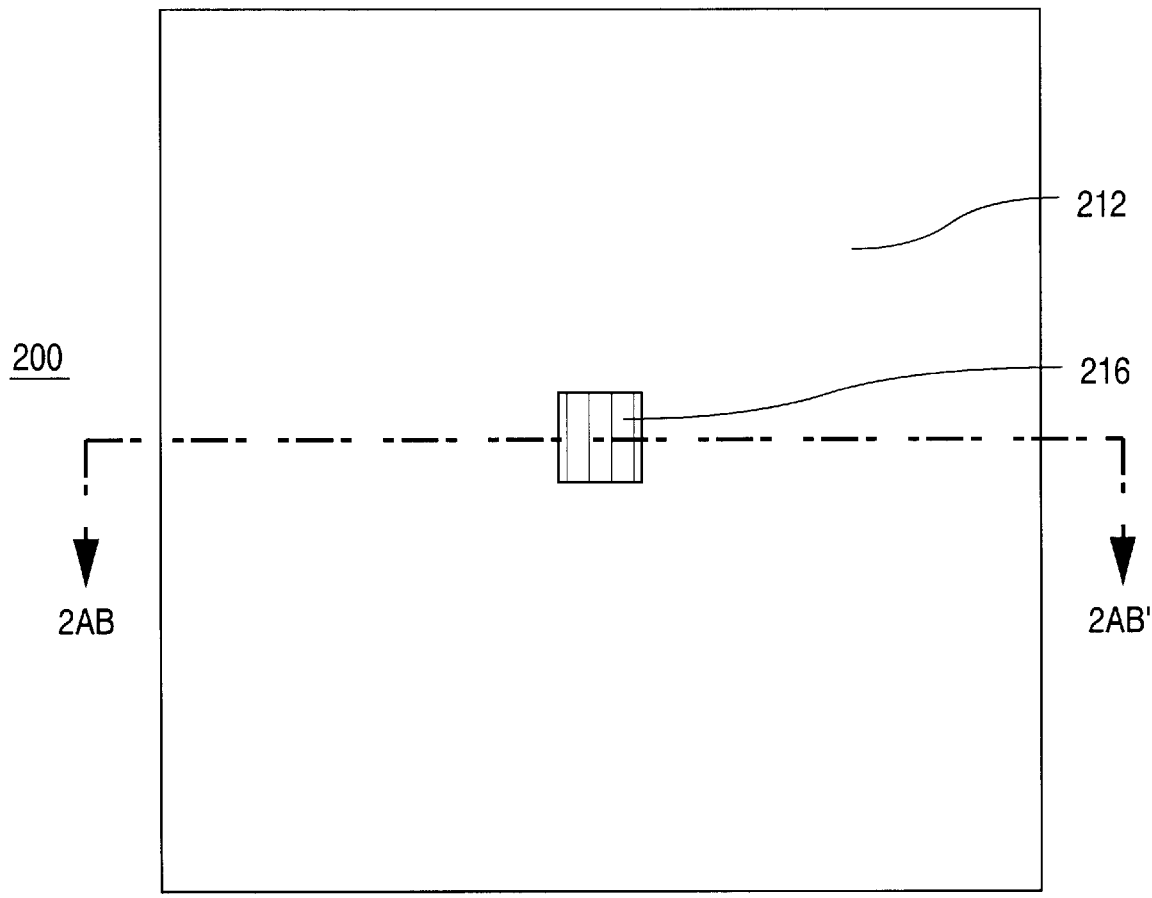
FIGS. 2AA–2DB show plan and cross-sectional views of the conventional process steps for forming an array of pixel cells.
Figure 2A:
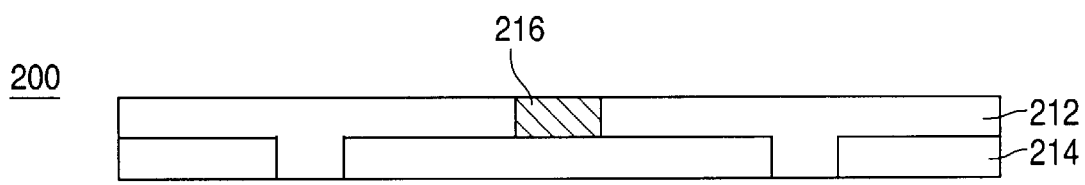
Figure 2B:
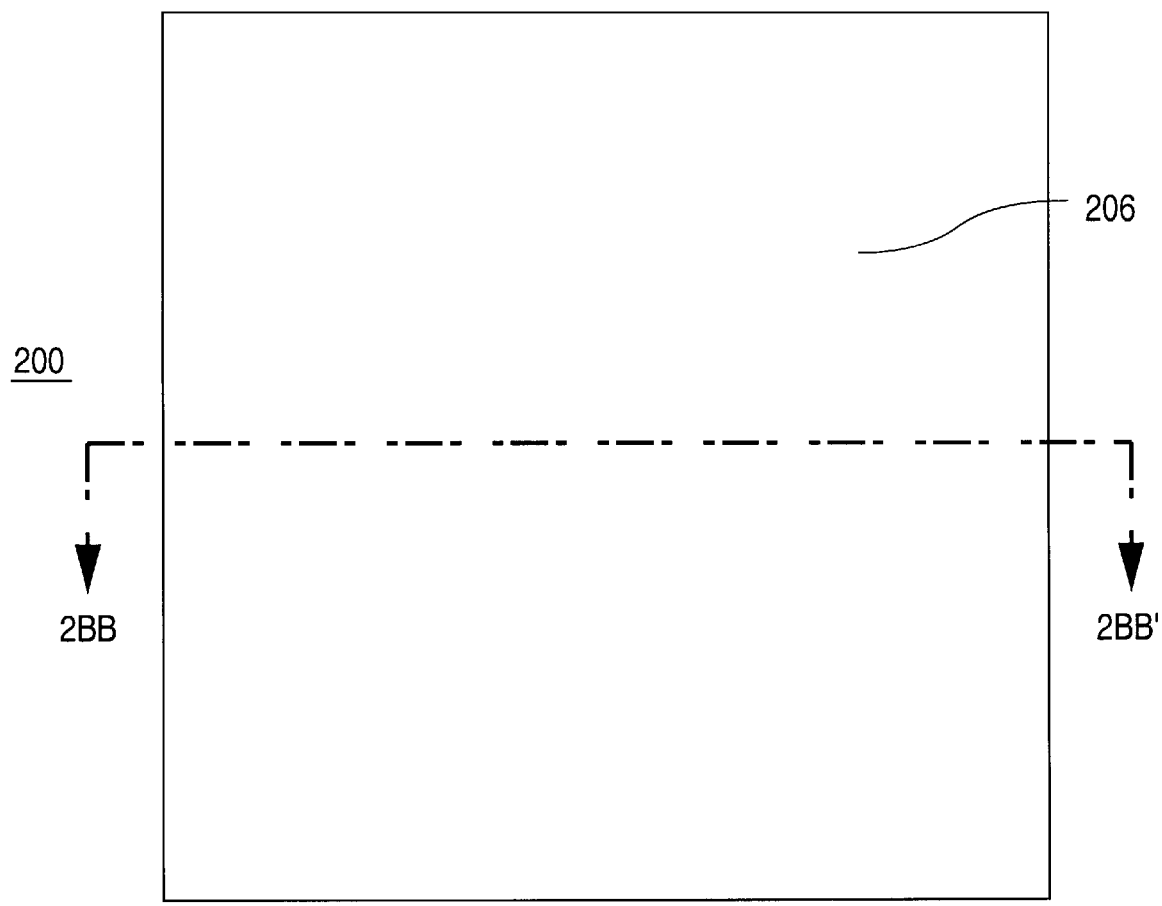
Figure 2B:
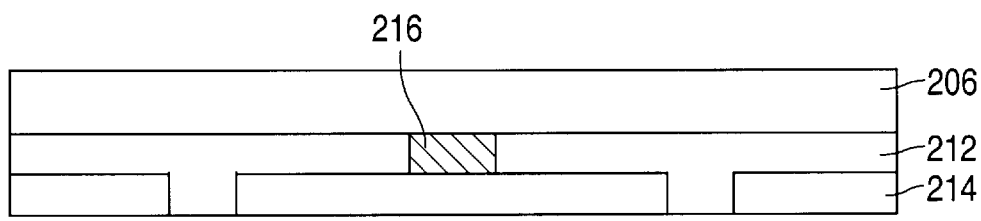
Figure 2C:
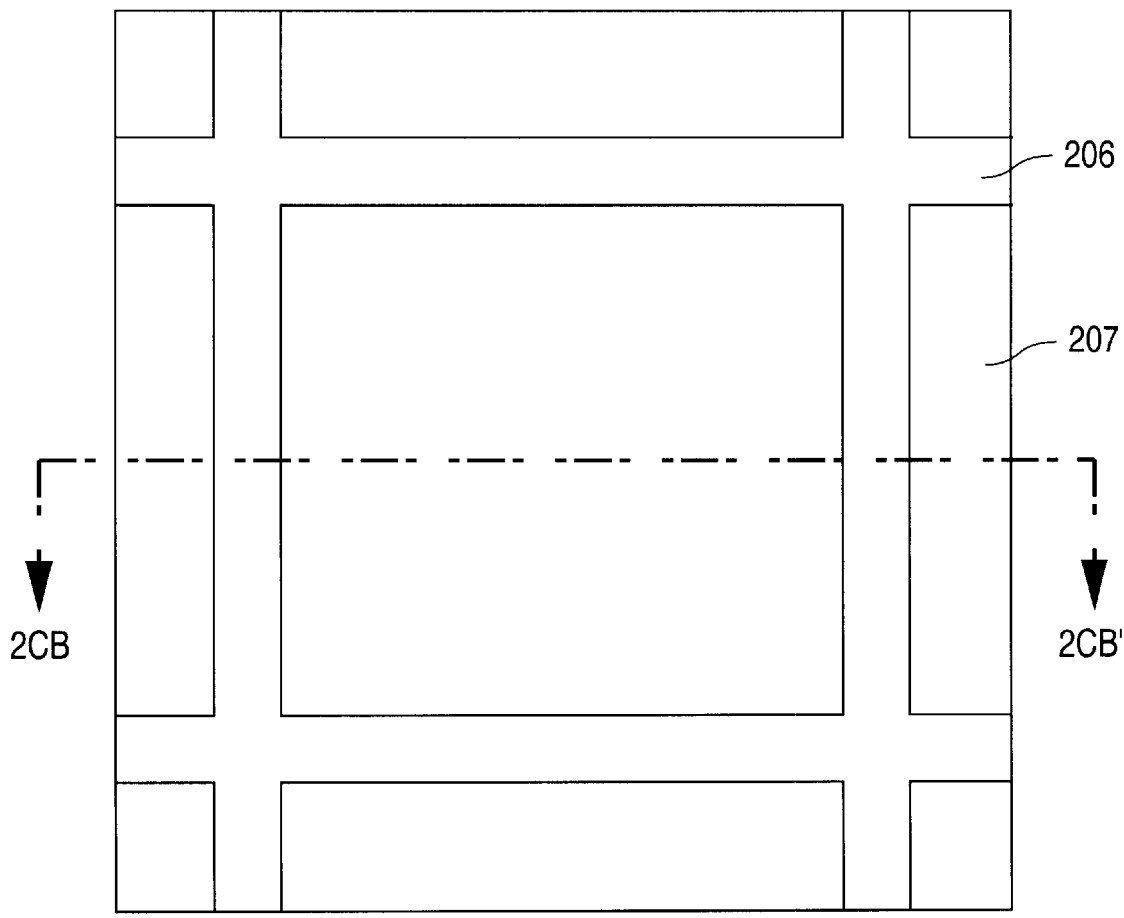
Figure 2C:
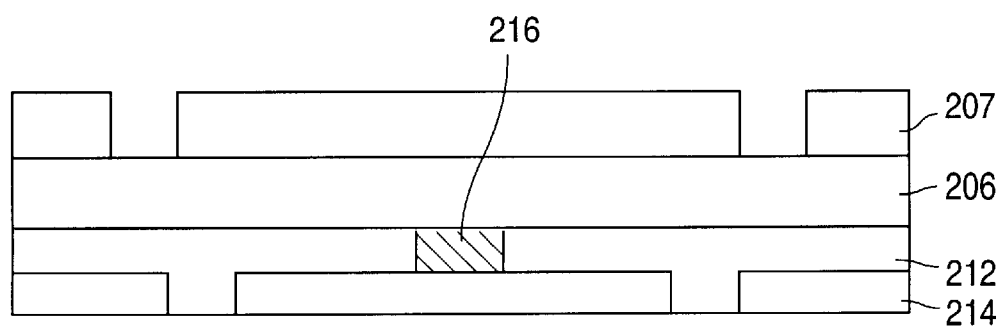
Figure 2D:
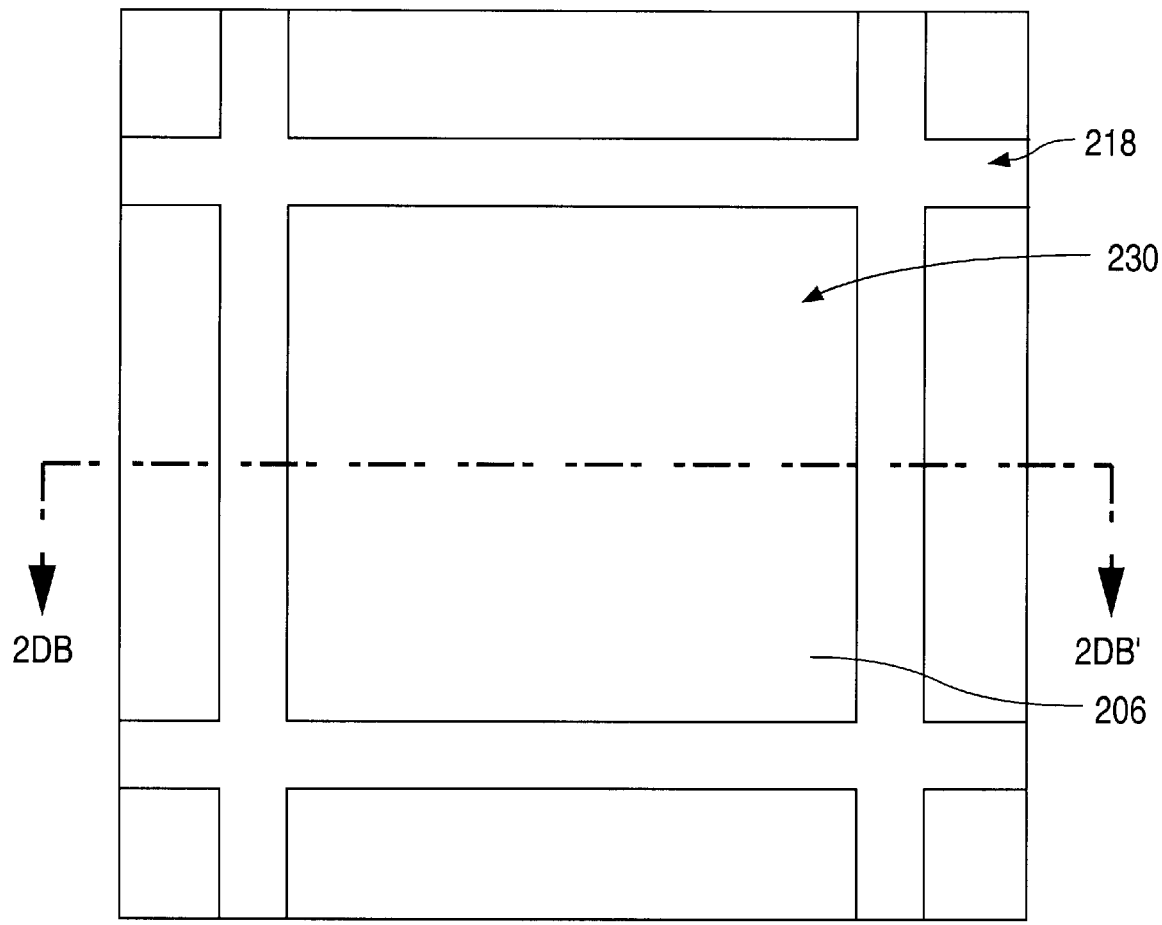
Figure 2D:
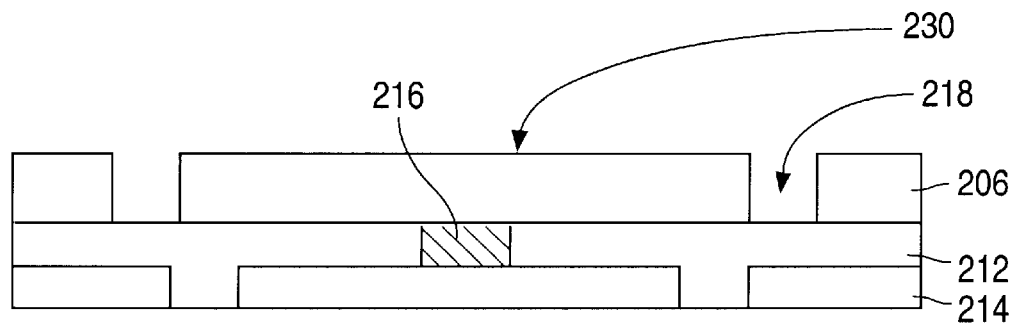
Figure 3:
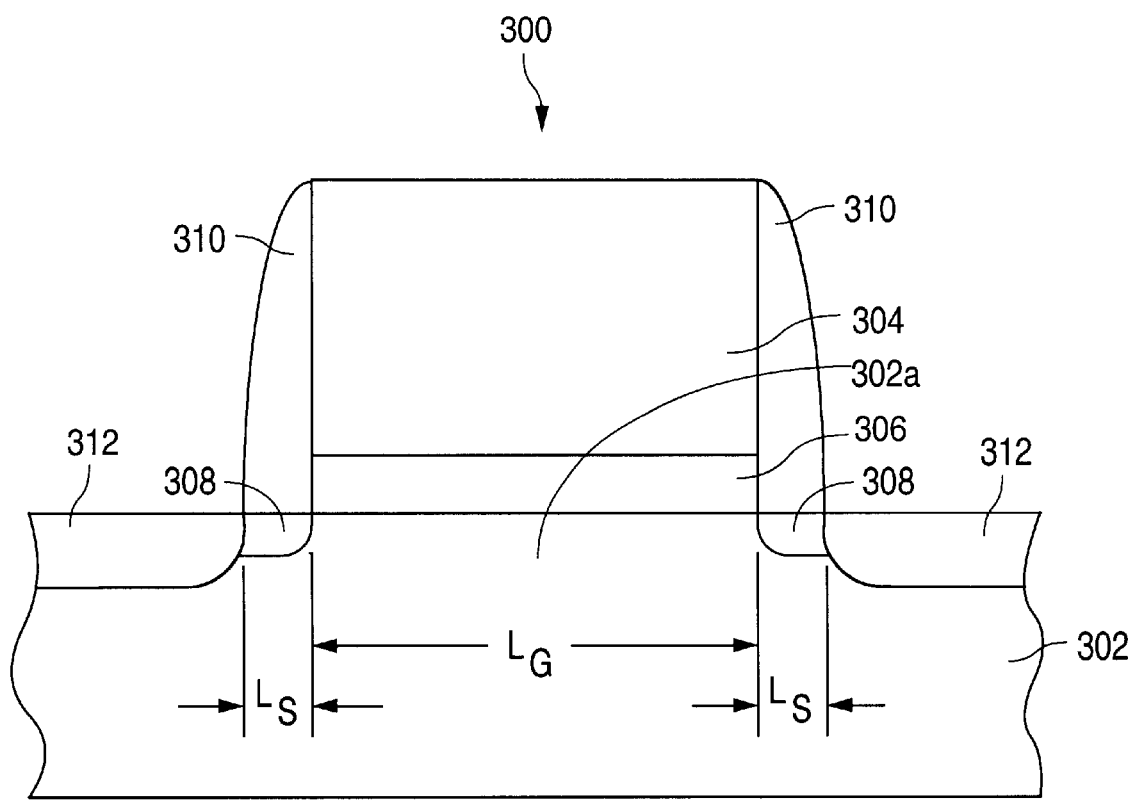
FIG. 3 shows a cross-sectional view of an exemplary CMOS gate structure.

FIG. 3 shows a cross-sectional view of an exemplary CMOS gate structure. First, gate 300 is formed over single crystal silicon 302 to define a channel region 302a. Gate 300 consists of polysilicon layer 304 overlying gate oxide layer 306.

Lightly-doped drain (LDD) regions 308 are then implanted into single crystal silicon 302, aligned to the edge of gate 300. Dielectric spacer structures 310 are then formed adjacent to gate 300. Spacer structures 310 are created by forming a dielectric layer that conforms to vertical sidewalls 300a of gate 300, and then carefully etching the dielectric layer to leave only spacer structures 310.

Finally, source/drain regions 312 are implanted into single crystal silicon 312, aligned to spacer structures 310. Source/drain regions 312 are linked to channel 302a by LDD regions 308.

The length of the gate ($L_G$) is the defining feature of a CMOS device. In general, the minimum linewidth capability of a given photolithography system thus generally defines $L_G$. In many photoresist systems, the thickness of the spacers ($L_S$) is typically substantially less than the gate length.

The present invention utilizes dielectric spacer structures to accomplish sublithographic electrical isolation of adjacent electrodes of a pixel array. In this process, a first metal layer is formed over an upper intermetal dielectric and then etched to create a checkerboard pattern. A dielectric layer conforming to this surface is deposited and then carefully etched to leave only spacer structures along the sidewalls of raised portions of the first metal layer.

A second metal layer is then formed over the entire surface. The second metal layer is subjected to chemical-mechanical polishing such that exposed tops of the dielectric spacer structures serve to separate and electrically isolate electrodes of adjacent pixel cells.

Figure 4A:
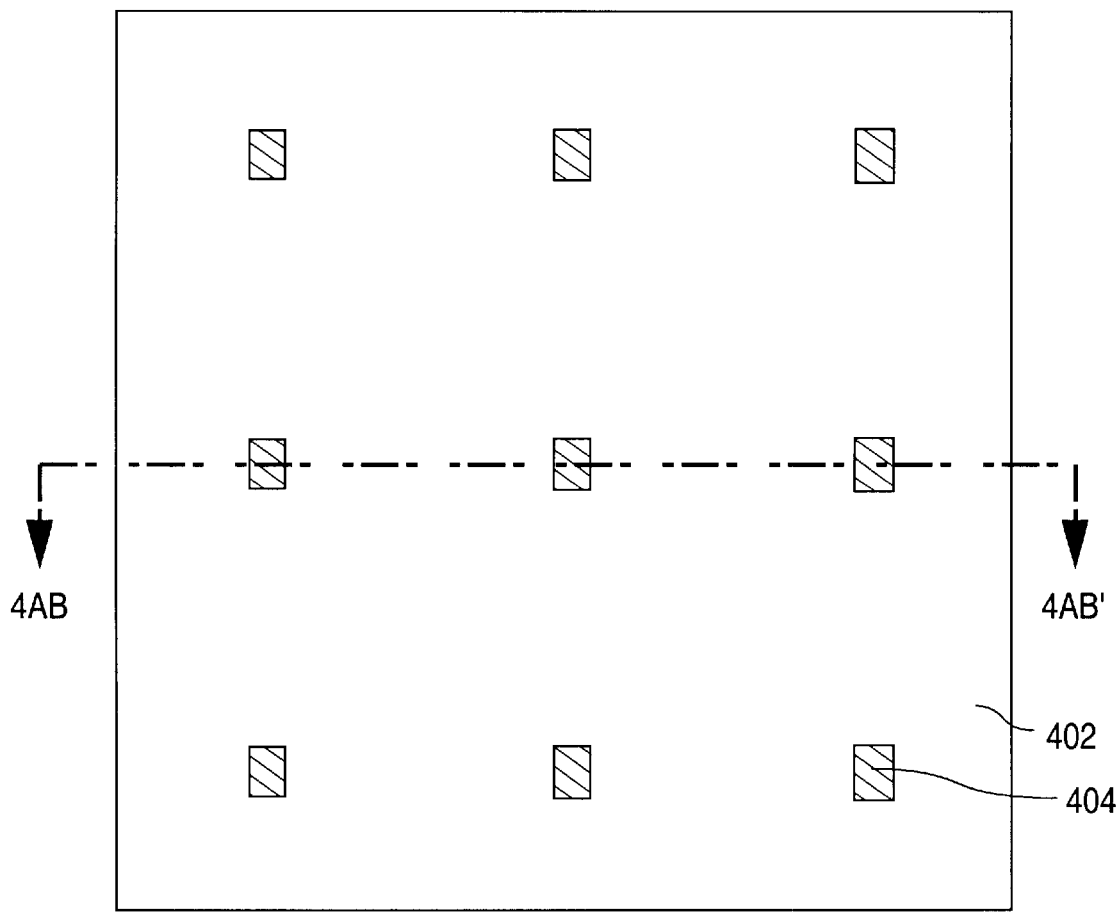
FIGS. 4AA–4HB show plan and cross-sectional views of the process steps for forming an array of pixel cells in accordance with a first embodiment of the present invention.
Figure 4A:
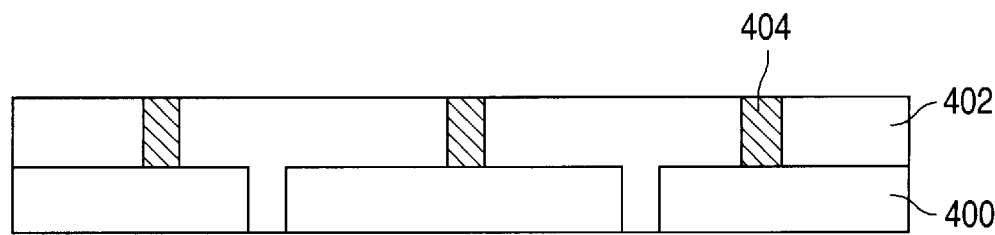

FIGS. 4AA–4HB illustrate the process steps for forming an array of pixel cells in a light valve in accordance with a first embodiment of the present invention utilizing two metal layers. For purposes of convention, all FIGS. 4A illustrate a top view of the pixel cell array, and all FIGS. 4B illustrate a cross-sectional view of the pixel cell array along line 4_B–4_B' of the FIG. 4A.

FIGS. 4AA–4AB illustrate the starting point for the process. Upper intermetal dielectric layer 402 is formed over upper interconnect metallization layer 400. Vias are etched through upper intermetal dielectric layer 402 to stop on upper interconnect metallization layer 400. These vias are then filled with electrically conducting material to form via plugs 404.

Figure 4B:
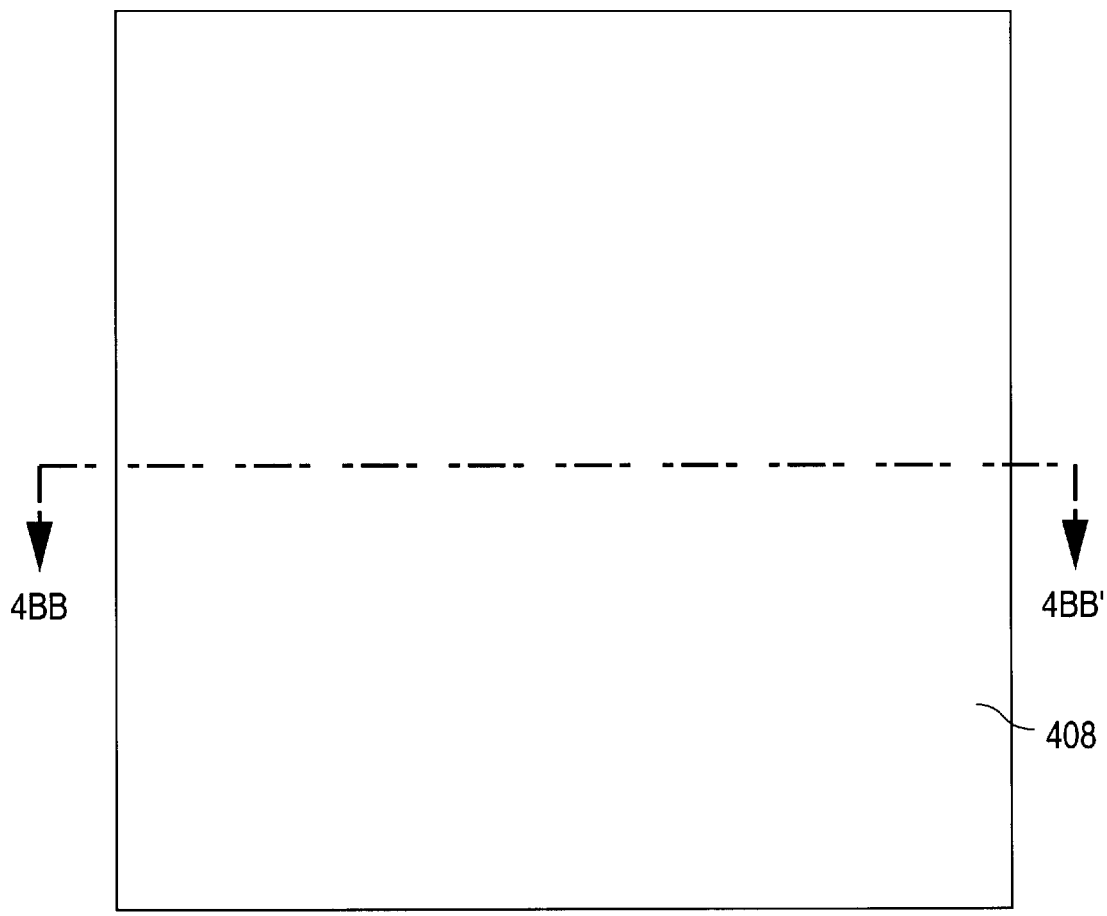
Figure 4B:
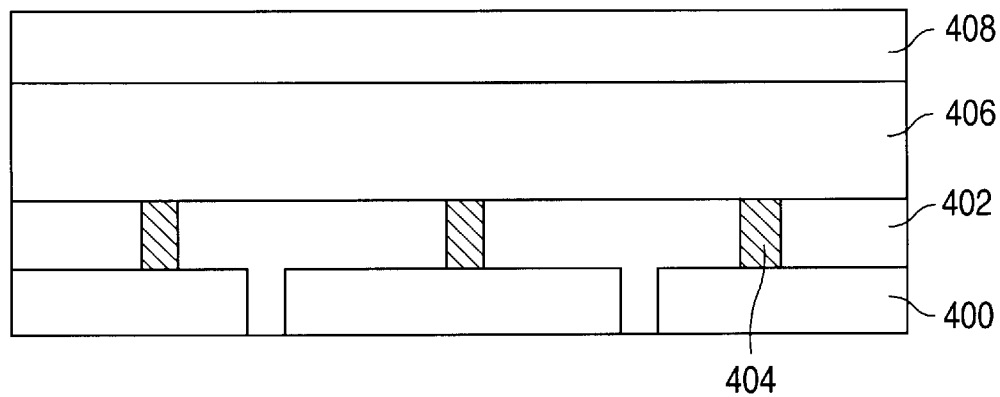
Figure 4C:
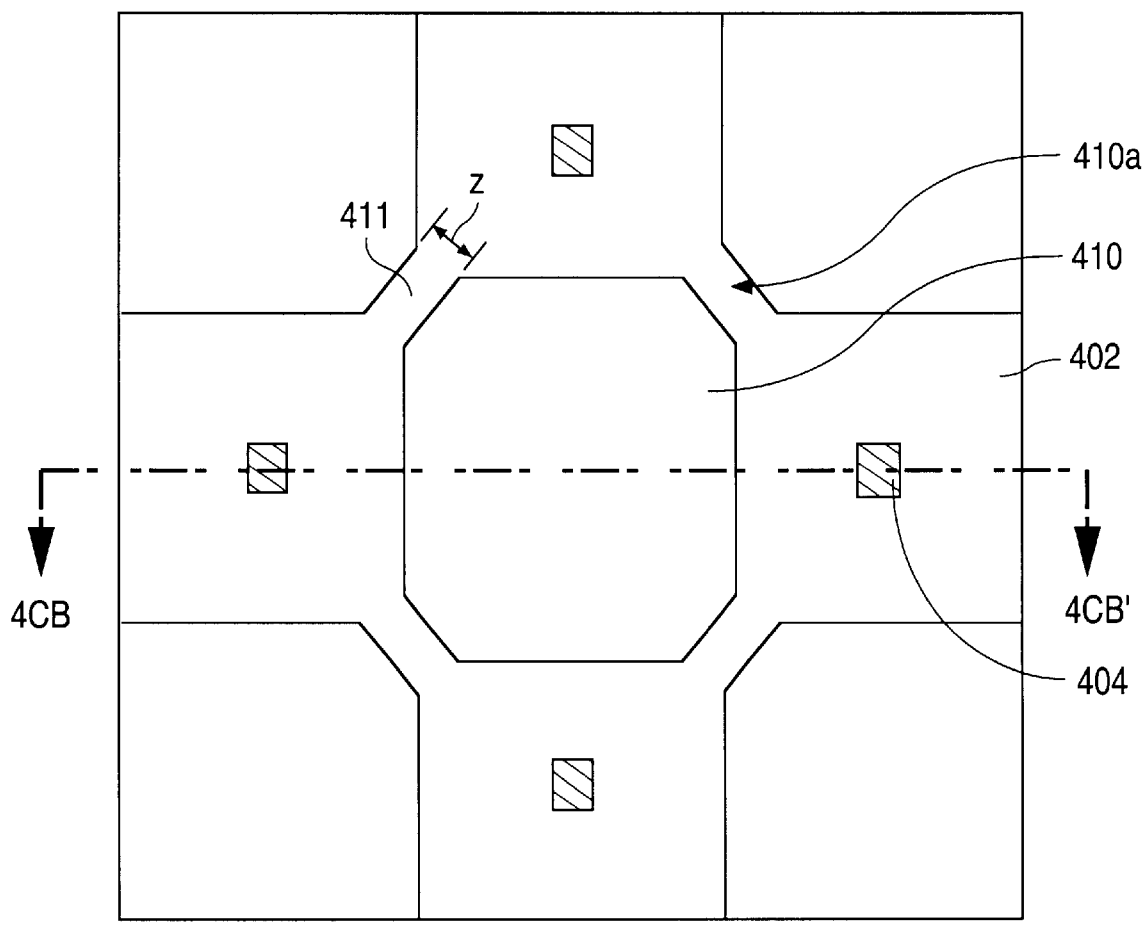
Figure 4C:
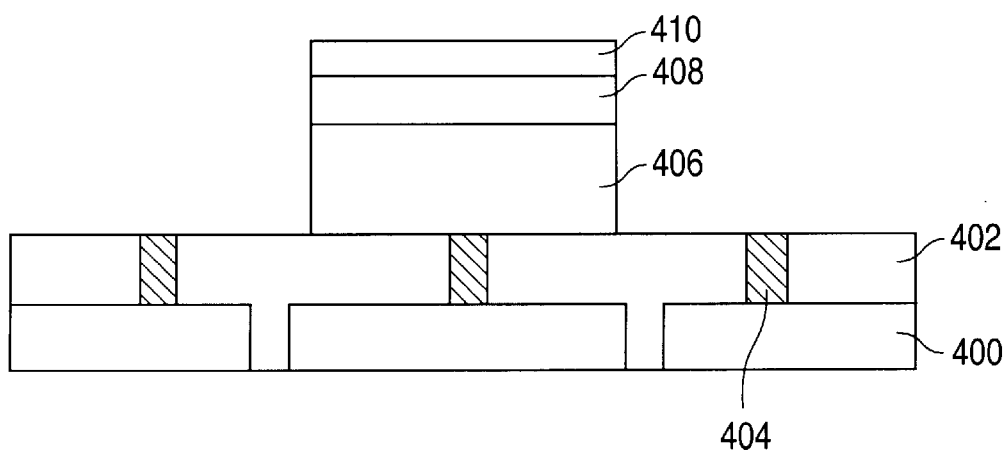

FIGS. 4BA–4BB show the next step, wherein first metal layer 406 is formed over the entire surface, and first dielectric layer 408 is formed over first metal layer 406. FIGS. 4CA–4CB show patterning of a photoresist layer, followed by development to form first metal mask 410. First dielectric layer 408 and first metal layer 406 are then etched in unmasked regions.

In FIG. 4CA, first metal mask 410 is shown in the form of a slightly modified checkerboard, with corners 410a excluded. As described in detail below, exclusion of corners 410a from first metal mask 410 creates gap 411 having a width Z between the tips of diagonally situated electrodes, thereby ensuring adequate inter-pixel isolation.

Figure 4D:
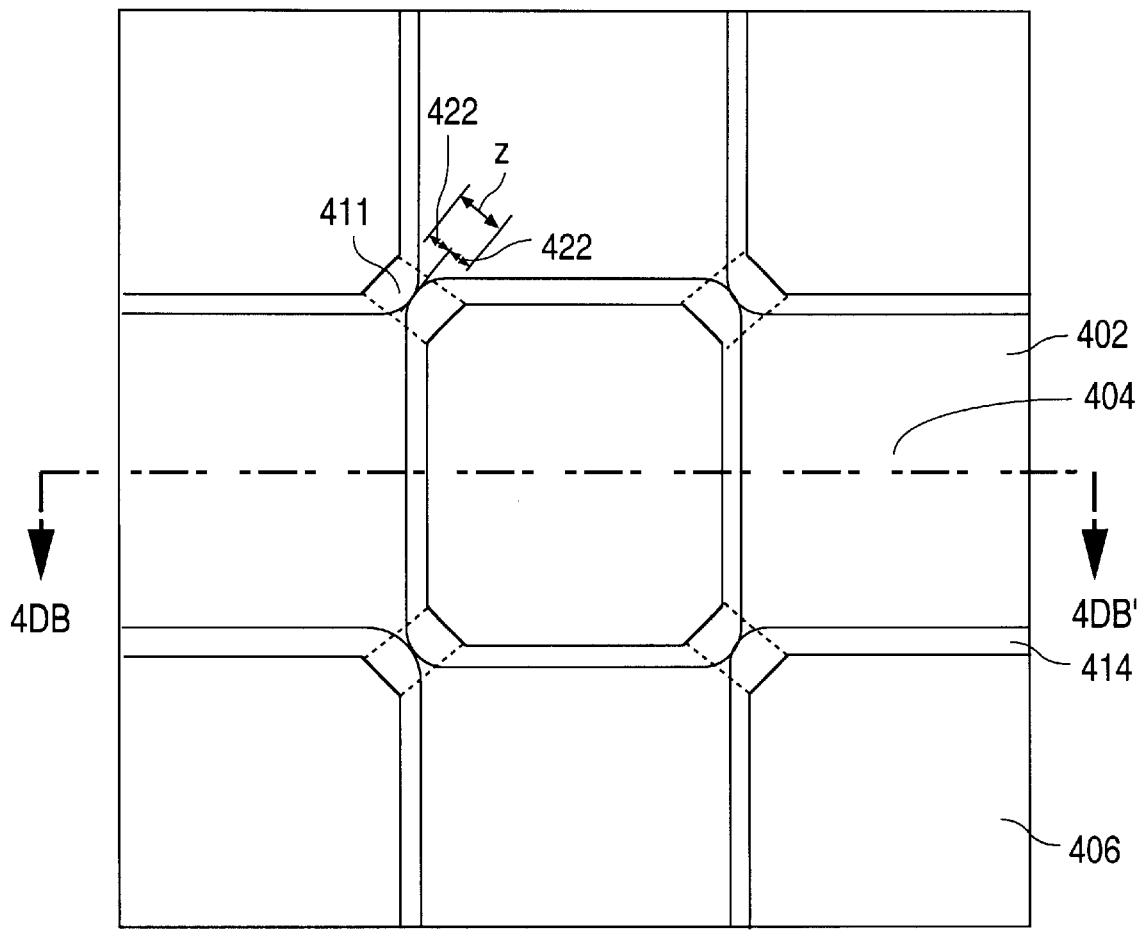
Figure 4D:
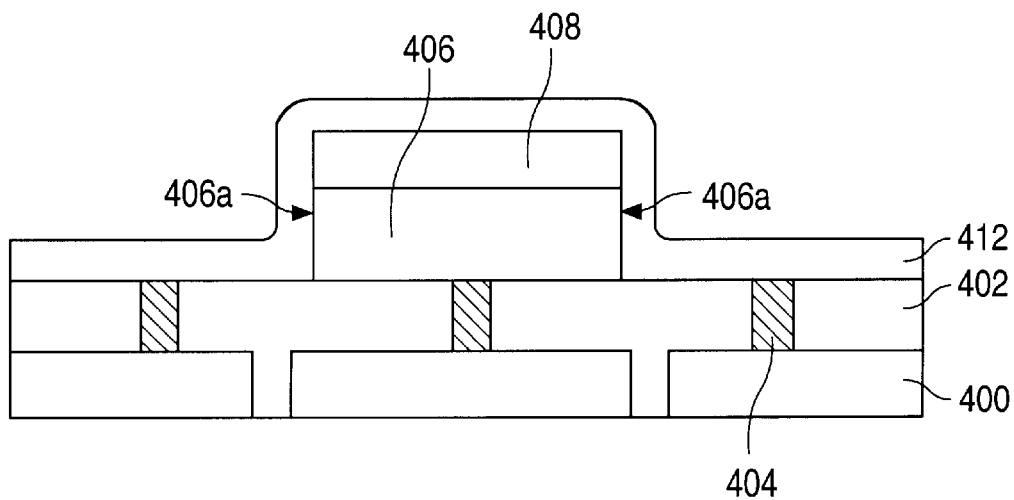

FIGS. 4DA–4DB show stripping of first metal mask 410, followed by formation of second dielectric layer 412 over the entire surface, including raised portions of first metal layer 406. Second dielectric layer 412 conforms closely to the underlying metal topography, becoming vertical along raised sidewalls 406a of first metal layer 406. Careful control over the rate of chemical vapor deposition of dielectric material during this step can result in the formation of spacer walls substantially narrower than the minimum linewidth of a given photolithography system.

In order to ensure proper electrical isolation between diagonally-situated pixel electrodes, the combined thickness of the dielectric material formed on opposing sides of gap 411 must be greater than the width Z of gap 411. Assuming an equal rate of deposition on both sides of gap 411, the thickness of dielectric layer 411 must therefore be at least ½Z, and preferably larger.

Figure 4E:
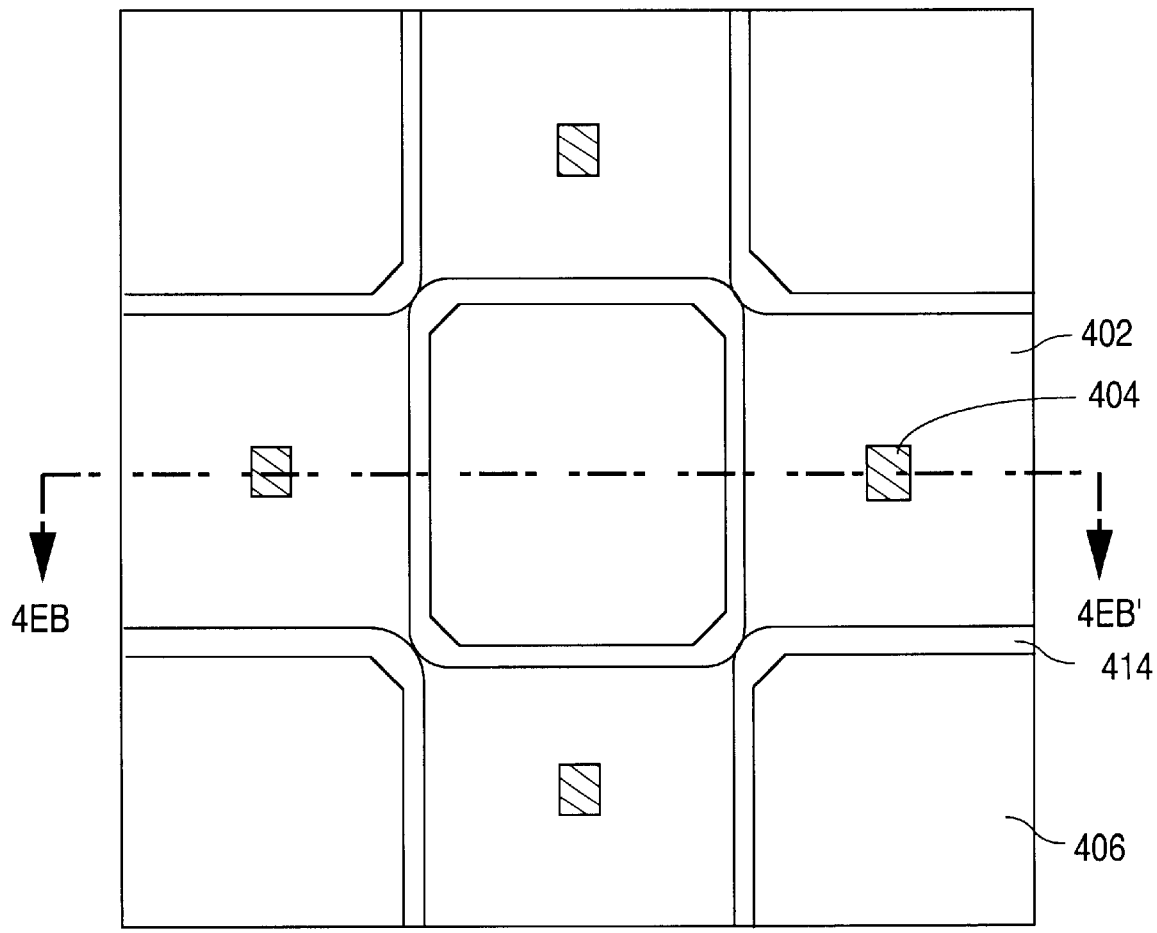
Figure 4E:
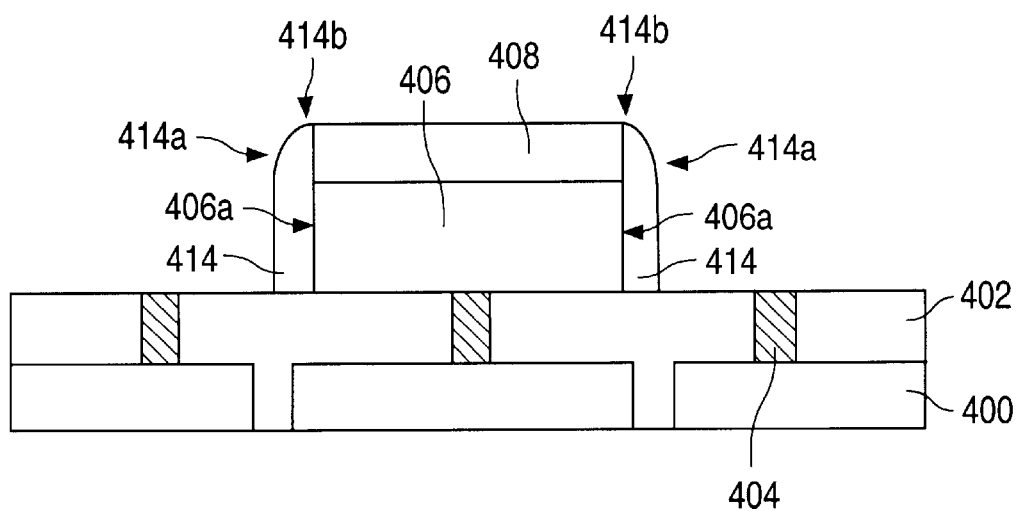

FIGS. 4EA–4EB show anisotropic etching of second dielectric layer 412. This etching is carefully controlled, so that dielectric material is completely removed over the surface of upper intermetal dielectric 402 and via plugs 404, but remains along sidewalls 406a of raised portions of first metal layer 406 as dielectric spacer structures 414. Dielectric spacer structures 414 have a curved upper surface 414a culminating in tip 414b. Curved upper surface 414a manifests the shape of second dielectric layer 412 as originally deposited. After the etching shown in FIGS. 4EA–4EB, dielectric material also remains on the top of raised first metal layer 406 in the form of first dielectric layer 408. First dielectric layer 408 may survive etching during this step by virtue of being composed of a different dielectric material having a different etch susceptibility than second dielectric layer 412. Alternatively, the etching step shown in FIGS. 4EA–4EB may be timed in order to leave some dielectric remaining over the first metal layer.

Figure 4F:
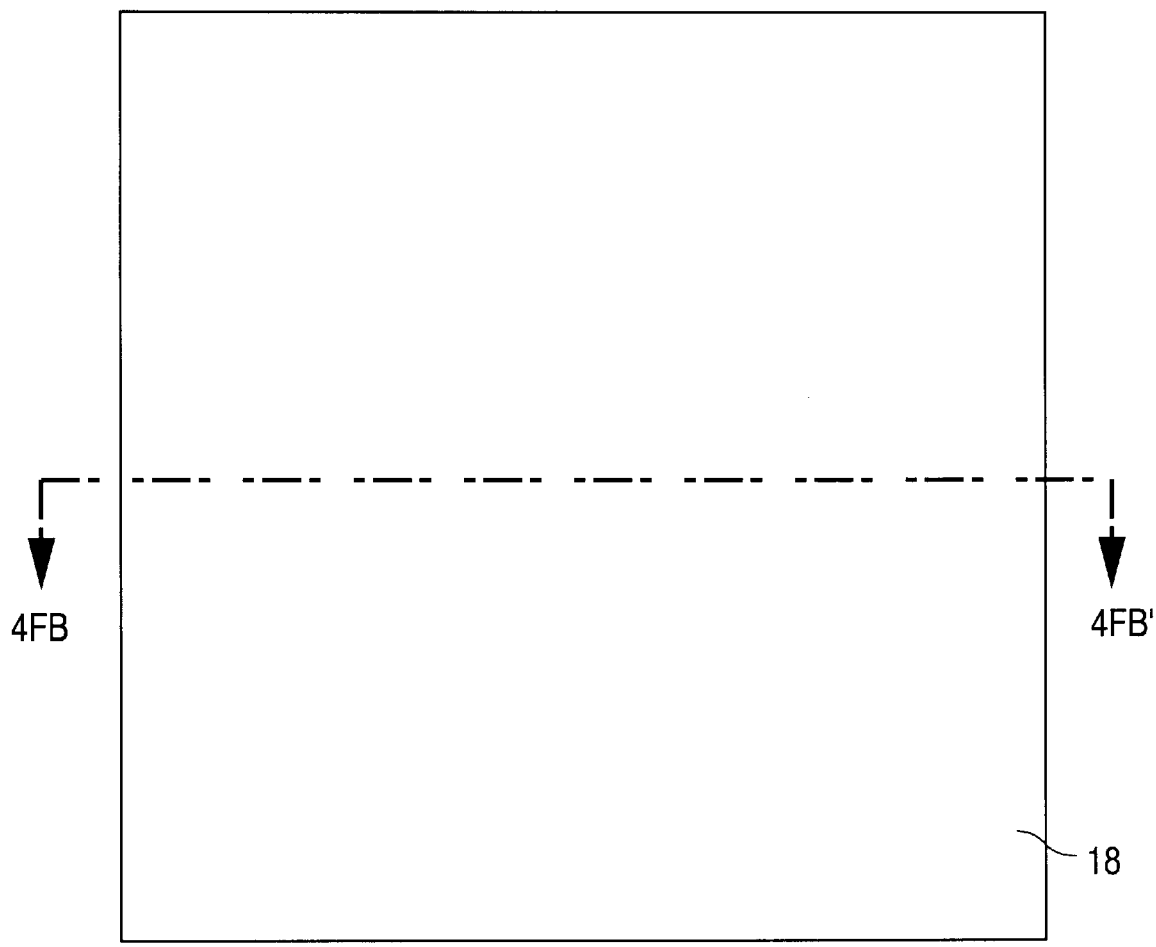
Figure 4F:
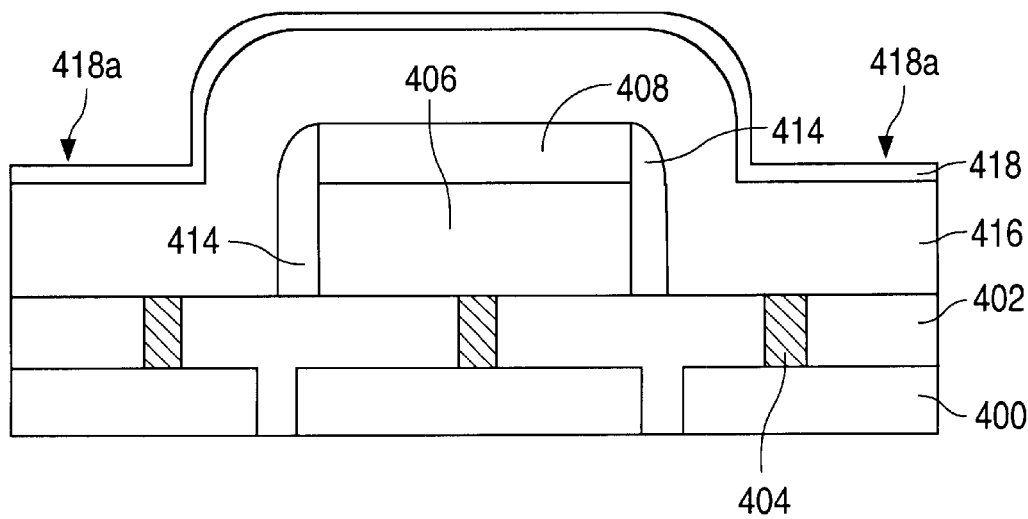

FIGS. 4FA–4FB show the next step in the process flow, wherein second metal layer 416 is formed over the entire surface, and third dielectric layer 418 is formed over second metal layer 416. The thickness of second metal layer 416 is carefully controlled to match the thickness of first metal layer 406.

Figure 4G:
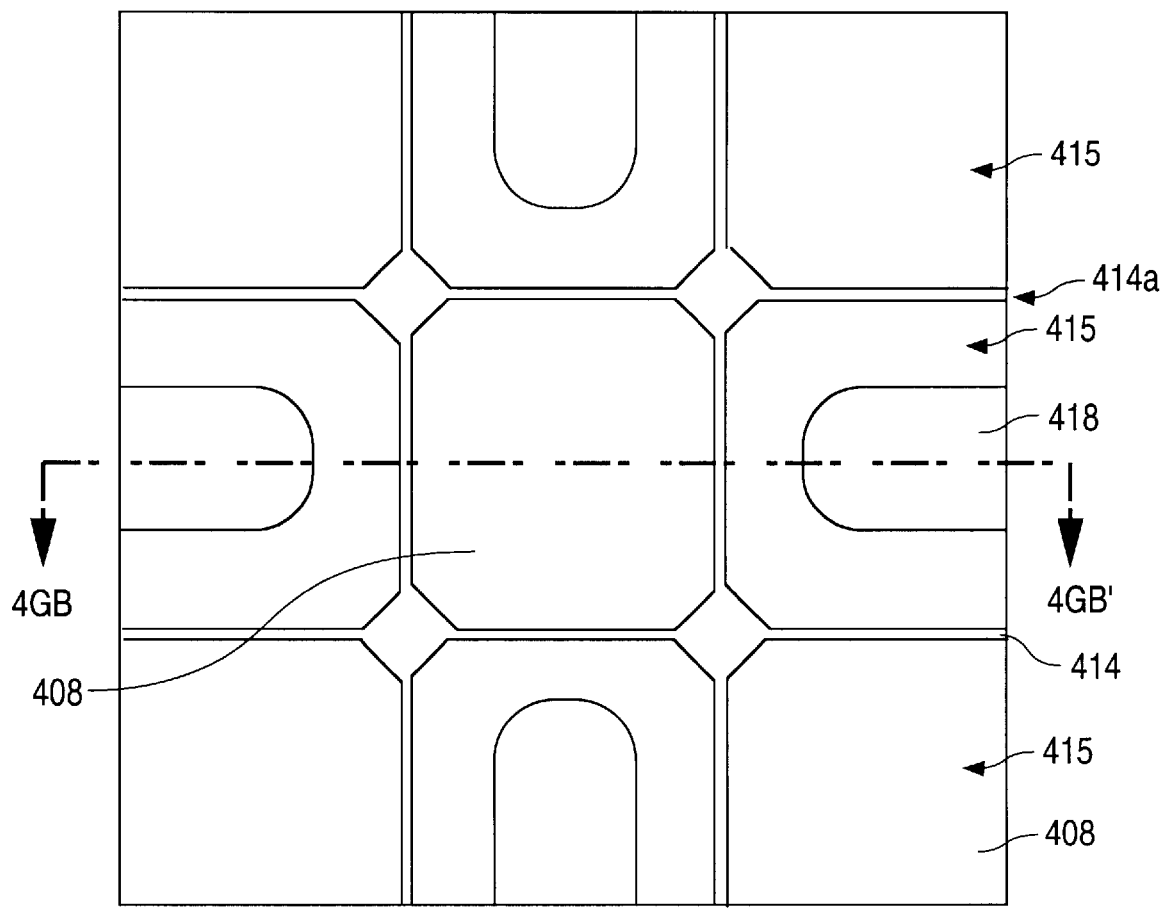
Figure 4G:
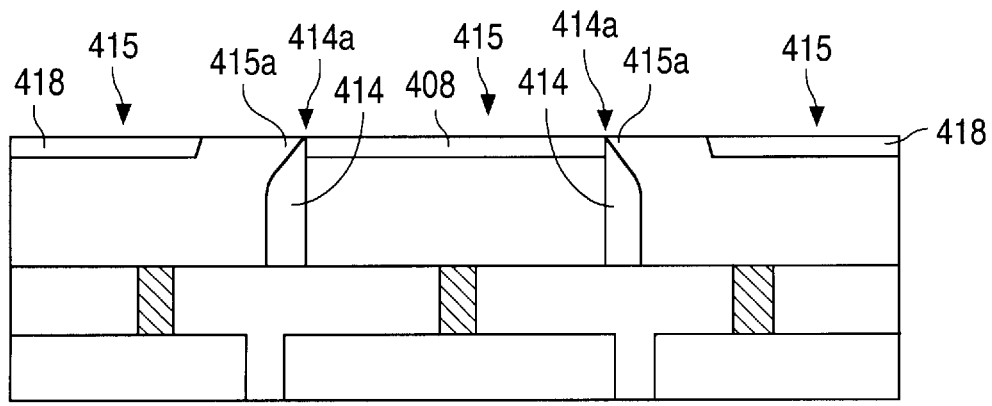

FIGS. 4GA–4GB show chemical-mechanical polishing of the entire surface to stop upon lower portions 418a of third dielectric layer 418. This chemical-mechanical polishing halts upon tips 414b of spacer structures 414, leaving the adjacent pixel electrodes 415 electronically isolated by tips 414b of the spacer structures. Curved upper surface 414a supports overlying edge 415a of pixel electrode 415.

Figure 4H:
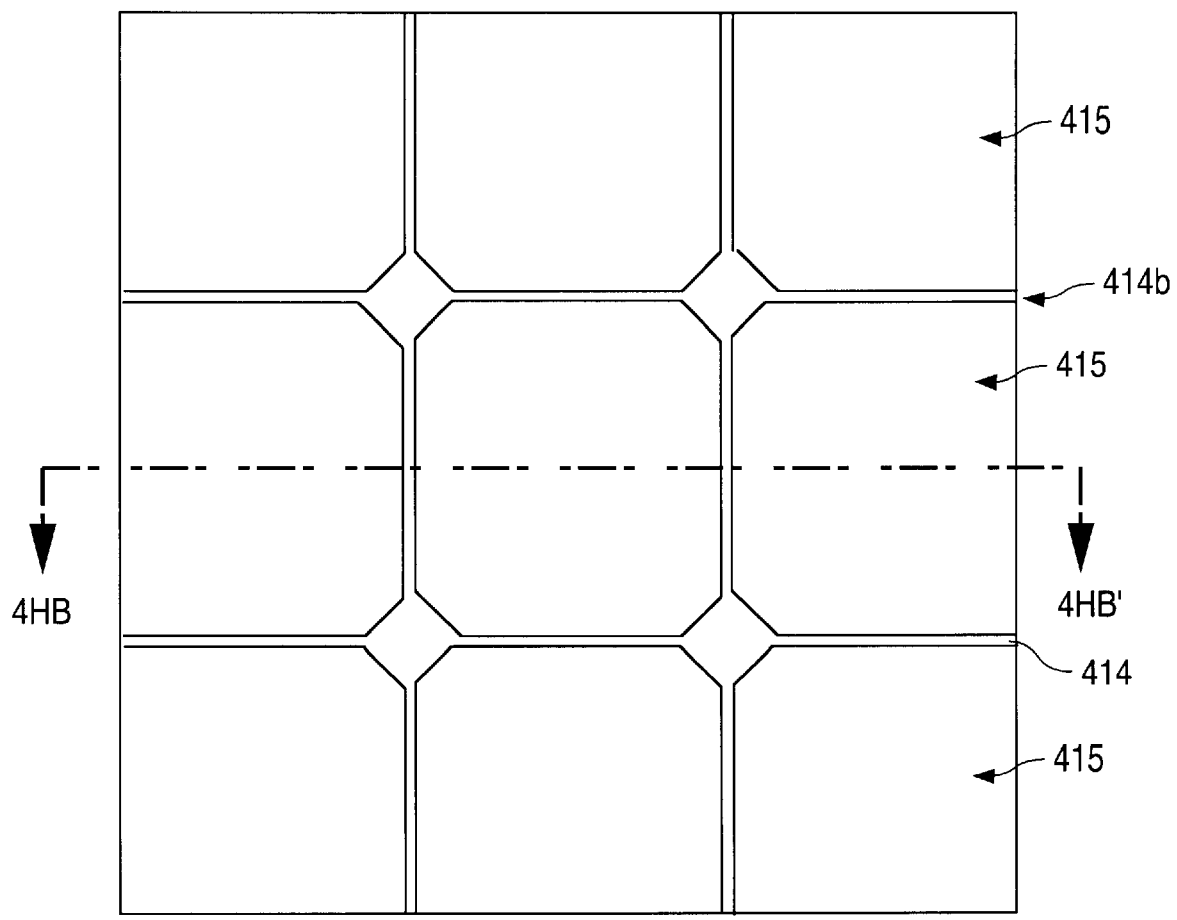
Figure 4H:
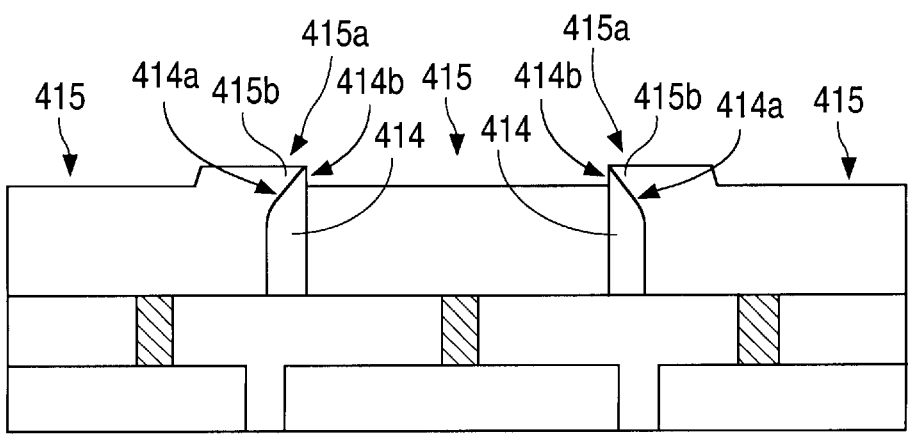

FIGS. 4HA–4HB show completion of fabrication of pixel cells of the array by etching remaining portions of the first and the third dielectric layers to expose the reflective surface of pixel electrodes 415.

FIG. 4HB depicts some surface topology in pixels formed from the second metal layer. This topology results where the second metal layer originally conformed to raised portions of the first metal layer. However, the relative size of this topology is exaggerated in FIG. 4GB, because the width of the pixel would actually be much greater than the thickness of the remaining dielectric layer.

Fabrication of the liquid crystal silicon light valve is completed by adding liquid crystal material, and then sealing a translucent top plate over the structure.

The thin LC transducer pixel cell and the process for forming this pixel cell in accordance with the present invention offers a number of important advantages. One advantage is that the shape of the dielectric spacer structures may be tailored to provide a metal shield over inter-pixel regions.

As discussed above, a major disadvantage of prior art pixel arrays is leakage of light through inter-pixel regions into the underlying interconnect and silicon substrate. One way to eliminate this problem is to form dielectric spacer structures having a structure which permits adjacent metal pixels to shield inter-pixel regions.

As shown in FIG. 4HB, edges 415a of pixel electrodes 415 project over curved surface portion 414b of dielectric spacers 414. This configuration is realized by halting the final chemical-mechanical polishing step just after the first appearance of the dielectric material composing the spacer structures. As depicted in FIG. 4HB, this endpoint will likely correspond to the appearance of dielectric material in the form of remaining underlying first dielectric layer 408 and/or lower portion 418a of third dielectric layer 418.

Figure 5:
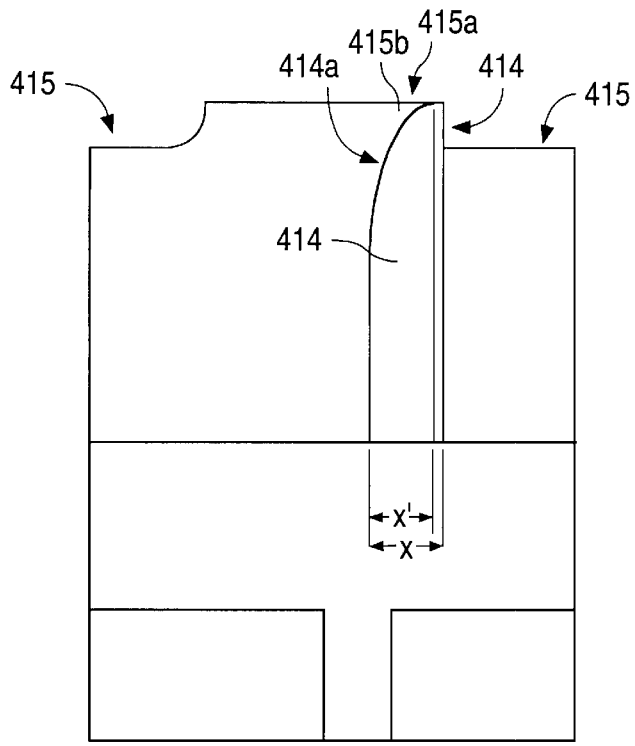
FIG. 5 shows an enlarged cross-sectional view of a portion of an array of pixel cells of FIG. 4HB.

FIG. 5 shows an enlarged cross-sectional view of the spacer tip of the pixel array shown in FIG. 4HB. Where metal electrode 415 conforms to top curved surface 414a of spacer structure 414, metal shield 415b is created at edge 415a of pixel electrode 415. Metal shield 415b projects across a substantial portion of the inter-pixel region. In this manner, metal shield 415b may block light incident to array 400 from penetrating through inter-pixel regions 402 into the underlying interconnect 404 and silicon substrate 405.

Metal shield 415b depicted in FIG. 5 projects a distance X' over an inter-pixel region 402 having a total width of X. The extent of shielding of a given inter-pixel region by the edge of a metal electrode would actually be determined by a number of factors, including but not limited to 1) the width of the spacer structure, 2) the width of the spacer structure relative to the height of the first metal layer, and 3) the width of spacer structure relative to the thickness of first dielectric layer.

A further important factor determining the extent of shielding of inter-pixel regions by metal electrode edges is CMP selectivity of the metal relative to the dielectric material of the spacer structures. The CMP shown in FIGS. 4FA–4FB commences with the third dielectric layer, and then proceeds into the second metal layer. As stated above, one possible endpoint for this polish step occurs when the second metal layer is eliminated and either the remaining first dielectric layer or lower portions of the third dielectric layer are encountered at a height corresponding to the dielectric spacer tips.

If CMP conditions such as pad type, slurry type, pH, or pad pressure are altered upon encountering this dielectric material in order to optimize dielectric removal at the expense of metal removal, the thin metal edges of the pixel electrodes are more likely to survive polishing, resulting in a correspondingly greater projection over inter-pixel regions. The self-limiting nature of a CMP process selective to dielectric versus metal during this step may play a significant role in enabling thin metal electrode edges to survive removal of overlying dielectric material.

Another important advantage of the present invention is that an array is formed having a high density of pixel cells. Because inter-pixel spacing can be reduced below limits imposed by photolithographic constraints, the present invention permits pixel electrodes to readily be positioned closer together than previously possible given a particular photolithography system. Closer spacing of pixels in turn permits finer resolution of images, and minimizes distortion caused by interruption in the otherwise continuous reflective backplane of the light valve attributable to inter-pixel topography. Closer pixel spacing also helps prevent unwanted leakage of light in the space between pixels.

Although the invention has been described in connection with one specific preferred embodiment, it must be understood that the invention as claimed should not be unduly limited to such specific embodiments. Various other modifications and alterations in the structure and process will be apparent to those skilled in the art without departing from the scope of the present invention.

For example, FIG. 4CA shows the photoresist layer forming the first metal mask specifically patterned to exclude corners of the square portions, thereby providing space for dielectric material between diagonally-situated pixels. However, there are several possible alternatives to this step.

Figure 6:
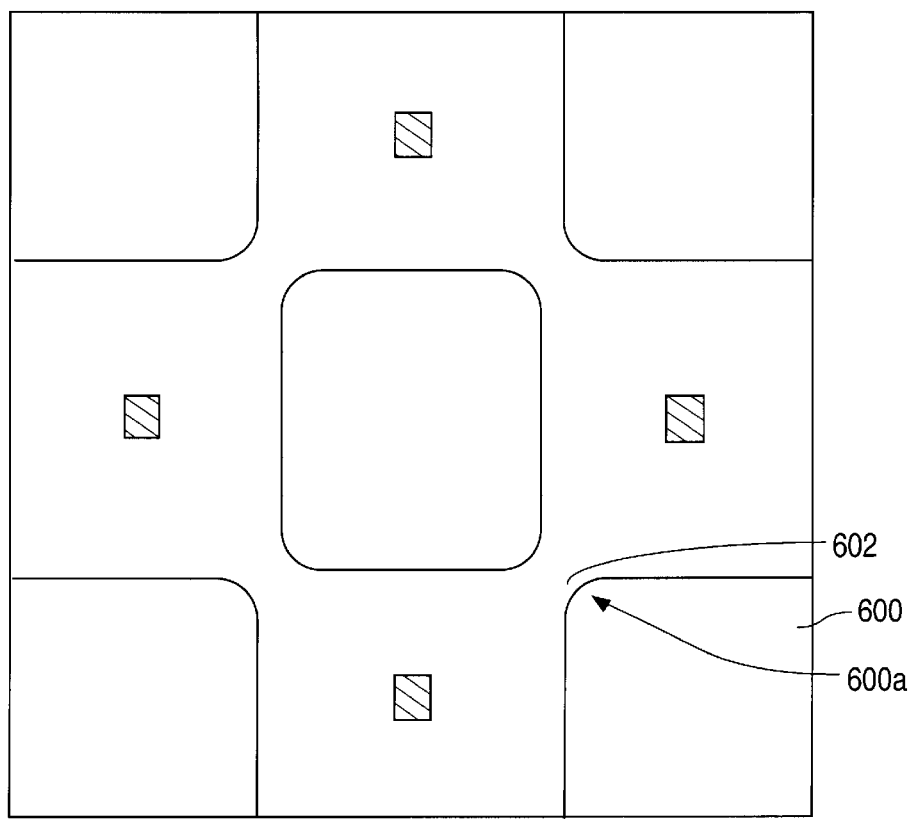
FIG. 6 shows a plan view of a first metal mask as employed in accordance with a second alternative embodiment of the present invention.

FIG. 6 shows a plan view of a photoresist mask in accordance with a first alternative embodiment of the present invention. In FIG. 6, first metal mask 600 is formed by patterning a photoresist layer in a precise checkerboard pattern, followed by carefully over-exposing the photoresist layer during development. As a result of this calculated over-exposure, corners 600a of first metal mask 600 become rounded and exclude corner portions 602.

Figure 7:
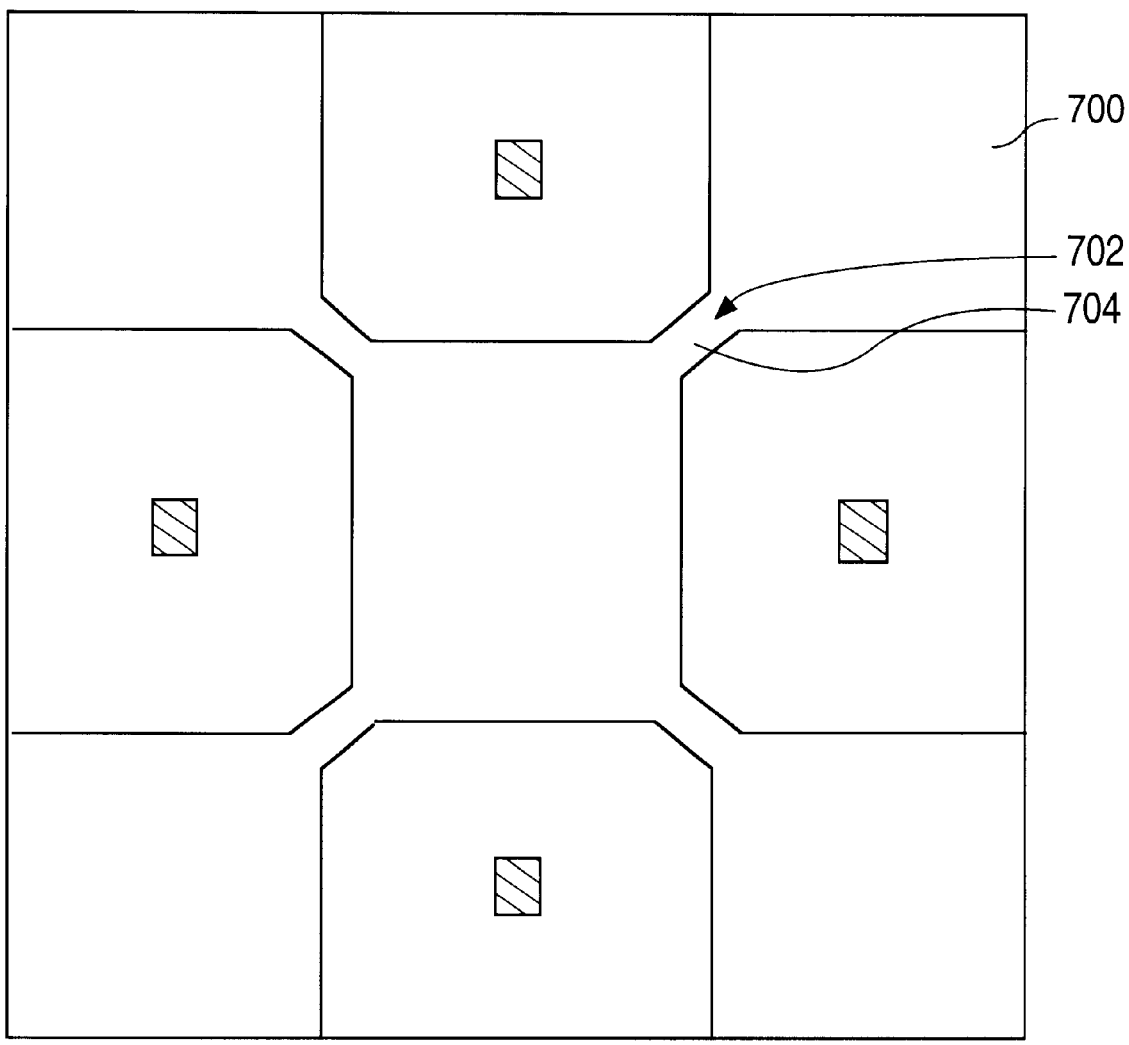
FIG. 7 shows a plan view of a first metal mask as employed in accordance with a third alternative embodiment of the present invention.

FIG. 7 shows a plan view of a photoresist mask in accordance with a second alternative embodiment of the present invention. The exposure kinetics of a particular photolithography system may require surplus photoresist material in corner regions in order to ensure that gaps are formed between diagonally-situated electrodes. Photoresist layer 700 therefore includes corner portions 702 linked together by tabs 704. Development of the patterned photoresist layer 700 may ultimately eliminate tabs 704 altogether, creating the necessary gaps to form between corners of diagonally-situated pixels.

Composition of the various layers making up the array may be varied to achieve optimum device performance and/or process efficiency. For example, FIGS. 4AA–4HB depict successive formation of first and second dielectric layers. These dielectric layers may be composed of silicon oxide, silicon nitride, or any other conforming dielectric material whose rates of formation and etching can be precisely controlled.

Furthermore, significant advances have recently been reported in creating materials having particularly low dielectric constants. Promising "low-k" dielectric materials include, but are not limited to, fluorosilicate glass (FSG), nanoporous silica, and organic polymers.

The thicknesses of the various layers of the array could also be varied and the array would still remain within the scope of the present invention. Thus, by employing low-k dielectric materials to provide inter-pixel isolation, thickness of the dielectric spacers may be decreased. This is because equivalent electrical isolation between adjacent pixels may be accomplished utilizing the same volume of dielectric material. Pixel arrays having even greater cell densities, higher resolution, and reduced light leakage between pixels may thus be formed in accordance with the present invention.

Variation in the chemical-mechanical polishing step presents another alternative embodiment of the present invention. For example, while FIGS. 4HA–4HB depict chemical-mechanical polishing through the third dielectric layer into the second metal layer to form the array, an alternative approach would be to dispense entirely with the third dielectric layer, with the expectation that exposing the second metal layer to CMP would not overly degrade its reflectance, and that a polish endpoint could be identified upon encountering the first dielectric layer remaining over the first metal layer.

While FIGS. 4HA–4HB depict removal of first and third dielectric layers remaining over the pixel electrodes, this is also not required by the present invention. In accordance with a further alternative embodiment of the present invention, portions of the first and third dielectric layers surviving CMP of the second metal layer could be left in place. These remaining dielectric layers may function to passivate the electrode surface, and also possibly enhance reflectance of the electrode by generating constructive interference of reflected light. Utilizing dielectric layers to generate constructive interference of reflected light is explained in detail in co-pending U.S. patent application Ser. No. 08/872,013, entitled "REFLECTANCE ENHANCING THIN FILM STACK" and incorporated herein by reference.

Finally, while FIGS. 4DA–4DB depict formation of dielectric spacer structures by deposition of a conforming second dielectric layer, it is also possible to form this dielectric layer by thermal oxidation. In such an alternative embodiment, a conformal layer of polysilicon could be deposited over the raised features of the first metal layer, with the polysilicon subsequently oxidized. In this alternative embodiment, care must be taken to ensure that the deposited polysilicon is sufficiently oxidized such that little or no polysilicon remains at electrode corners that could permit unwanted electrical contact to occur between diagonally-situated pixels.

Given the multitude of embodiments described above, it is therefore intended that the following claims define the scope of the present invention, and that the methods and structures within the scope of these claims and their equivalents be covered hereby.

What is claimed is:

1. A light valve structure comprising:
   an array of pixel cells arranged in a checkerboard pattern structure that includes a first set of squares alternating with a second set of squares, the first set of squares formed from a first metal layer and wherein each square included in the first set of squares has truncated corners, and the second set of squares formed from a second metal layer; and
   dielectric spacer structures formed on sidewalls of each square included in the first set of squares and intervening between the first set of squares and the second set of squares, the dielectric spacer structures including a curved upper portion that supports a peripheral edge of each of the second set of squares such that the edge extends over the curved upper portion to substantially shield the dielectric spacer structures from incident light.

2. The light valve structure according to claim 1, and wherein the dielectric spacer structures comprise silicon oxide.

3. The light valve structure according to claim 1, and wherein the dielectric spacer structures comprise silicon nitride.

4. The light valve structure according to claim 1, and wherein the dielectric spacer structures comprise a low-k dielectric material selected from the group consisting of fluorosilicate glass (FSG), nanoporous silicon and organic polymers.

* * * * *